(12) United States Patent
Gouzou et al.

(10) Patent No.: US 10,675,971 B2
(45) Date of Patent: Jun. 9, 2020

(54) DRIVE ASSEMBLY FOR A MOTOR VEHICLE DRIVE SHAFT

(71) Applicant: POCLAIN HYDRAULICS INDUSTRIE, Verberie (FR)

(72) Inventors: Christophe Pierre Jean Gouzou, Verberie (FR); Francois-Xavier Le Lay, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 0 days.

(21) Appl. No.: 15/304,834

(22) PCT Filed: Apr. 24, 2015

(86) PCT No.: PCT/EP2015/058902
§ 371 (c)(1),
(2) Date: Oct. 17, 2016

(87) PCT Pub. No.: WO2015/162252
PCT Pub. Date: Oct. 29, 2015

(65) Prior Publication Data
US 2017/0174076 A1   Jun. 22, 2017

(30) Foreign Application Priority Data

Apr. 25, 2014 (FR) ..................... 14 53739

(51) Int. Cl.
*B60K 17/24* (2006.01)
*B60K 5/04* (2006.01)
(Continued)

(52) U.S. Cl.
CPC ............... *B60K 17/24* (2013.01); *B60K 5/04* (2013.01); *B60K 17/10* (2013.01); *B60K 17/356* (2013.01); *B60Y 2410/1022* (2013.01)

(58) Field of Classification Search
CPC ...... B60K 17/24; B60K 17/10; B60K 17/356; B60K 5/04; B60Y 2410/1022
(Continued)

(56) References Cited

U.S. PATENT DOCUMENTS 1,717,204 A *   6/1929   Gotz ..................... F16C 9/04
                                             384/457
4,040,337 A *   8/1977   Foster .................. F04B 1/0413
                                             91/491
(Continued)

FOREIGN PATENT DOCUMENTS

CN       103660932 A      3/2014
EP       3135907 A1 *     3/2017   .............. F04B 1/053
(Continued)

OTHER PUBLICATIONS

Search Report in French Application No. 1453739 dated Dec. 10, 2014, with English translation coversheet. 2 pages.
(Continued)

*Primary Examiner* — Hau V Phan
*Assistant Examiner* — Steve Clemmons
(74) *Attorney, Agent, or Firm* — Womble Bond Dickinson (US) LLP (57) ABSTRACT

A drive assembly for a motor vehicle drive shaft including an engine, a gearbox, and a shaft (50) divided into two half-shafts coupled to a differential. A hydraulic machine (10) is linked to the gear box or to the differential in order to be driven by said link. The hydraulic machine (10) forms a bearing (100) for one of the half-shafts (54).

20 Claims, 6 Drawing Sheets

(51) Int. Cl.
    *B60K 17/10*         (2006.01)
    *B60K 17/356*     (2006.01)

(58) Field of Classification Search
    USPC ......................................................... 180/297
    See application file for complete search history.

(56) References Cited

U.S. PATENT DOCUMENTS

| | | | | |
|---|---|---|---|---|
| 4,057,007 | A * | 11/1977 | Denker | F01B 3/0035<br>74/567 |
| 4,413,701 | A | 11/1983 | Kumagai | |
| 5,330,394 | A * | 7/1994 | Hauser | B60K 17/105<br>475/230 |
| 5,415,596 | A * | 5/1995 | Zulu | B62D 11/18<br>475/18 |
| 5,713,425 | A * | 2/1998 | Buschhaus | B60K 6/36<br>180/297 |
| 5,961,413 | A * | 10/1999 | Martin | B60K 17/02<br>475/83 |
| 6,293,381 | B1 * | 9/2001 | Shimada | F16D 31/02<br>192/103 F |
| 7,325,638 | B1 * | 2/2008 | Belloso | B60K 5/08<br>180/14.2 |
| 7,690,470 | B2 * | 4/2010 | Iwaki | B60K 17/30<br>180/252 |
| 8,181,731 | B2 * | 5/2012 | Bessho | B60K 5/04<br>180/305 |
| 9,649,924 | B2 * | 5/2017 | Nakaoka | B60K 5/04 |
| 2005/0070390 | A1 * | 3/2005 | Irikura | B60K 17/105<br>475/23 |
| 2006/0042839 | A1 * | 3/2006 | Iwaki | B60K 17/356<br>180/6.3 |
| 2007/0151222 | A1 * | 7/2007 | Iida | A01D 69/06<br>56/157 |
| 2008/0102967 | A1 * | 5/2008 | Gleasman | F16D 3/16<br>464/145 |
| 2008/0182712 | A1 * | 7/2008 | Kira | B60K 6/26<br>477/7 |
| 2009/0260911 | A1 * | 10/2009 | Nozaki | B60K 17/105<br>180/307 |
| 2009/0280950 | A1 * | 11/2009 | Michishita | B60K 6/34<br>477/3 |
| 2010/0154575 | A1 * | 6/2010 | Ueno | B60K 17/24<br>74/420 |
| 2012/0048638 | A1 | 3/2012 | Kim et al. | |
| 2014/0073472 | A1 | 3/2014 | Yoshimura et al. | |
| 2015/0021112 | A1 * | 1/2015 | Schmidt | B60K 5/02<br>180/243 |
| 2015/0053046 | A1 * | 2/2015 | Ibusuki | B60W 10/119<br>74/665 B |
| 2016/0311319 | A1 * | 10/2016 | Lundstrom | B60K 17/35 |
| 2016/0341307 | A1 * | 11/2016 | Nakayama | B60K 17/16 |

FOREIGN PATENT DOCUMENTS

| | | | |
|---|---|---|---|
| FR | 2 621 280 | A1 | 4/1989 |
| FR | 2621280 | A1 * | 4/1989 ............ B60K 17/04 |
| FR | 2 902 706 | A3 | 12/2007 |
| JP | S60 139533 | A | 7/1985 |
| JP | 2013-237338 | A | 11/2013 |

OTHER PUBLICATIONS

International Search Report in PCT/EP2015/058902 dated Jul. 20, 2015, with English translation. 5 pages.
Office Action received for Indian Application No. 201617035506 dated Mar. 12, 2020.

* cited by examiner

FIG. 1

State of the art

DRIVE ASSEMBLY FOR A MOTOR VEHICLE DRIVE SHAFT

The present invention relates to the field of drive assemblies for a motor vehicle drive shaft.

The present invention relates more precisely to drive assemblies for a first drive shaft, for example a front axle, comprising a hydrostatic pump coupled to the drive shaft for drawing power allowing providing the driving of a second shaft, for example a rear axle.

The invention applies particularly to drive assemblies in which a main motor generally formed of a heat engine is oriented transversely, i.e. with its output axis parallel to the shaft of the drive train and therefore transversely to the longitudinal direction of the vehicle.

Figure 1:
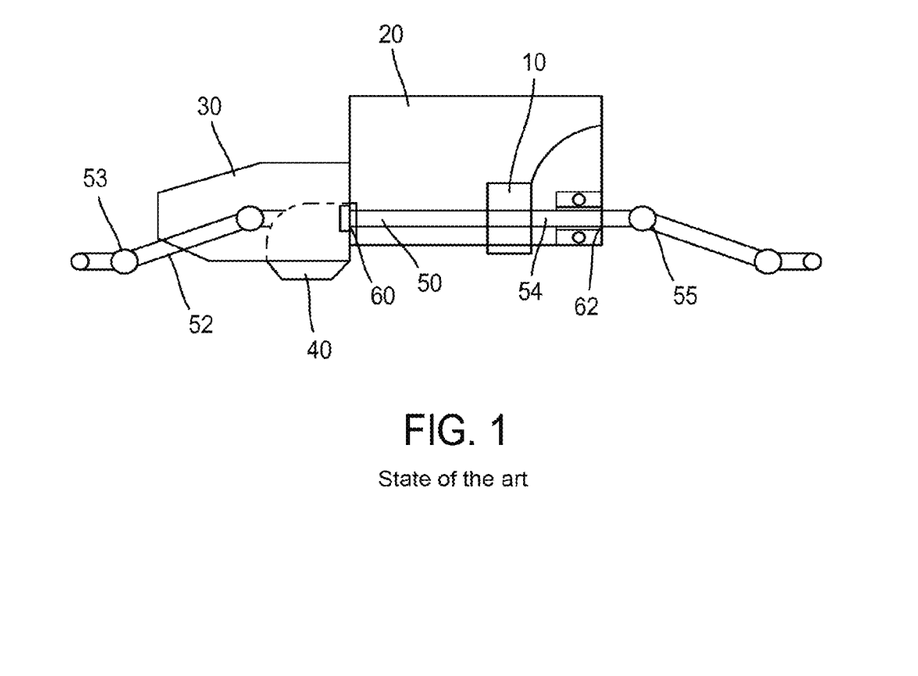
FIG. 1, previously described, shows a schematic view of a drive assembly conforming to the prior art.

Assemblies of the type illustrated in the appended FIG. 1, comprising in combination a main motor 20, such as a heat engine, a gearbox 30, a differential 40, a drive shaft 50 and a hydrostatic pump 10, have already been proposed.

The motor 20 drives the gearbox 30 which, for its part, drives the differential 40. The shaft 50 is split into two half-shafts 52, 54 associated respectively with universal joints 53, 55. The half-shafts 52, 54 are coupled to the differential 40. The hydrostatic pump 10 is itself adapted to be coupled to the output shaft of the gearbox 30 and is intended to provide a hydraulic feed to a second shaft or second drive train, to with for example the rear axle of a motor vehicle if the shaft 50 constitutes the front axle. It will be observed that, depending on the state of the art, at least one of the half-shafts 54 is carried on two bearings 60, 62 of which one, 62, forms an intermediate bearing.

The intermediate bearing 62 makes it possible to carry correctly the half-shaft 54 despite its great length due to the lateral offset of the differential 40 as a result of the transverse arrangement of the motor 20, i.e. with its output shaft parallel to the longitudinal axis of the shaft 50.

A known example of such an assembly is described in document FR-2621280.

The present invention now has the objective of improving the state of the art thus formed.

This aim is achieved according to the present invention thanks to a drive assembly for a motor vehicle drive shaft comprising a motor, such as a heat engine, associated with a gearbox which is itself coupled to a differential and a shaft split into two half-shafts coupled to the differential, characterized in that it comprises a hydraulic machine connected to the gearbox or to the differential to be driven by this linkage, the hydraulic machine forming a bearing for one of the half-shafts.

The integration on the hydraulic machine of a shaft support bearing makes it possible to effectively limit the vibrations and oscillations of the shaft, particularly when the gearbox is offset to one side at one end of the motor, leading to two half-shafts of different lengths, one long, the other short.

The installation of the hydraulic machine connected to the gearbox or to the differential to be driven by this linkage allows recovery of energy, or if appropriate restoring energy by means of the hydraulic machine.

The present invention also relates to hydraulic machines integrating the aforementioned bearing.

Other features, aims and advantages of the present invention will appear upon reading the detailed description which follows, made with reference to the appended drawings, given by way of non-limiting examples and in which.

The general architecture of the assembly conforming to the present invention resumes the arrangements previously described in reference to FIG. 1. This general architecture will therefore not be described in detail hereafter. It will be endeavoured, in the description that follows, to specify the elements which differentiate the invention from the prior art illustrated in FIG. 1.

It is nevertheless recalled that, as previously indicated, the invention relates to a drive assembly including:

a main motor, for example a heat engine,
a gearbox driven by the main motor,
a differential driven by the gearbox,
a shaft split into two half-shafts, which is coupled to the differential,
two universal joints coupled respectively to the half-shafts, and
a hydraulic machine, preferably intended for driving a second shaft, linked to the gearbox or to the differential.

Within the scope of the present application the term "universal joint" or the synonymous expression "Cardan joint" are used in their usual sense in the automobile field to designate a mechanism allowing transmission of a rotational movement to driving and steering road-wheels, while providing a rotational link between two shafts, one driving and one driven shaft, the axes whereof are concurrent, while allowing angular displacement of the driven shaft in all relative directions with respect to the driving shaft.

Moreover, in the scope of the present invention, the term "half-shaft" is used to designate a portion of a shaft which does not cover the entire length of a drive shaft and does not extend all the way between two driving wheels, but only on one portion of a drive shaft, between a differential and an associated universal joint, and the expressions "short shaft" and "long shaft" are used to designate such portions of a drive shaft having different lengths.

Figure 2:
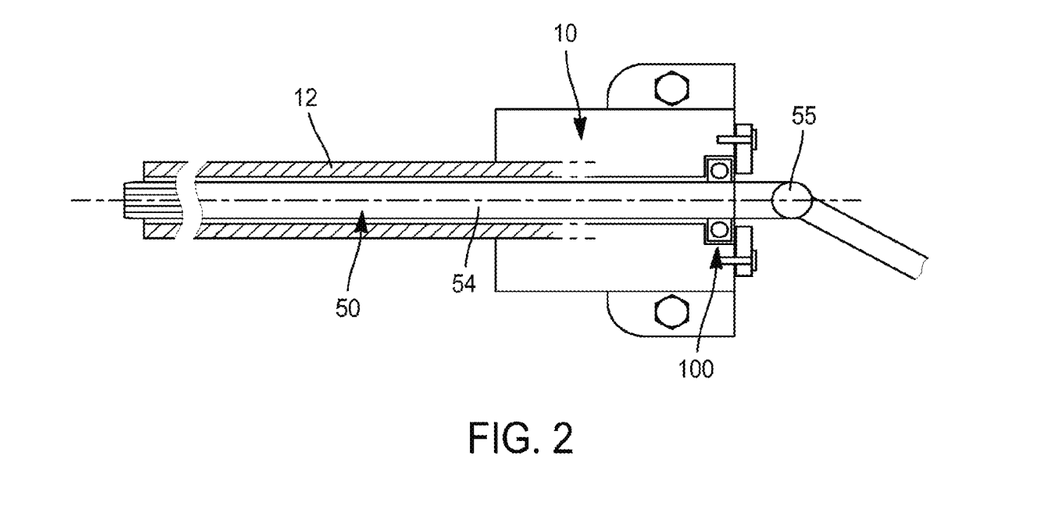
FIG. 2 shows a longitudinal section view of a drive assembly sub-assembly conforming to the present invention, conforming to a first variant embodiment.
Figure 2A:
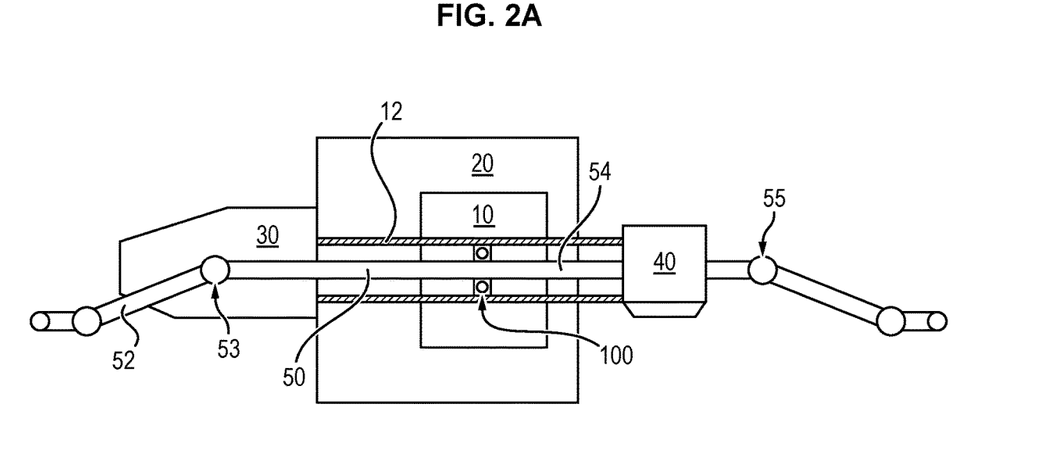
Figure 2B:
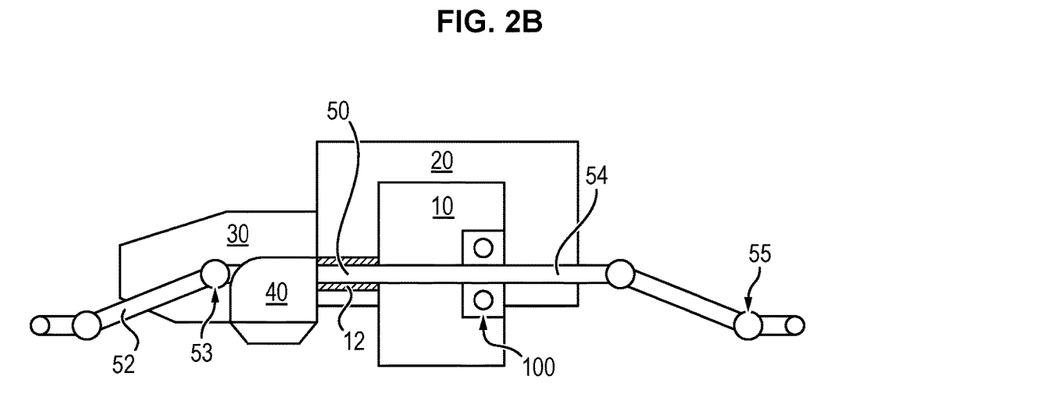

Represented on the appended FIG. 2 is a bearing 100 conforming to the present invention, carried by the hydraulic machine 10 which serves as a bearing for the mechanical transmission half-shaft 50 and thus serves as a universal joint bearing for the universal joint 55. The hydraulic machine 10 is driven by means of a tubular shaft 12 by the output of the gearbox 30 or the differential 40.

The half-shaft 50 associated with the universal joint 55, here a right universal joint, is housed inside the tubular shaft 12, coaxially therewith.

The bearing 100 is integrated in the hydraulic machine 10 which thus supports in rotation the half-shaft 50 in proximity to the universal joint 55.

Advantageously, the external tubular shaft 12 is connected to the crown gear or the cage of the differential 40 while the internal shaft 50 is connected to a satellite gear of the differential.

By way of a non-limiting example, the bearing 100 can be formed from a ball bearing.

The hydraulic machine 10 is preferably a radial piston machine.

Such machines are for example described in documents FR-2872227 and FR 2940672.

The general structure of such a radial piston machine is well known to a person skilled in the art and will therefore not be described in detail hereafter. It is recalled, however, that generally, hydraulic motors with radial pistons comprise, in the chamber of a casing, a hydraulic/mechanical transducer composed of a multilobe cam, a cylinder block mounted with relative rotation in the casing, a shaft linked in rotation to the cylinder block, pistons guided with radial sliding in respective cylinders of the cylinder block and supported on the lobes of the cam, and a distributor adapted to apply a fluid coming from a pressurized source successively and in a controlled manner to the pistons, so that the number of pistons being different from the number of lobes formed on the cam, the successive thrust by the pistons on the lobes of the cam drives the relative rotation of the cylinder block and the elements which are linked to it with respect to the casing.

Such a system is reversible, i.e., if the shaft or an element which is mechanically linked with it is driven in rotation by an external mechanical member, the cooperation of the pistons and of the multilobe cam generates successive pressures in the cylinders so that the hydraulic/mechanical transducer then constitutes, not a motor but a hydraulic pump.

One example embodiment of such a hydraulic machine including an external multilobe cam associated with a cylinder block and internal radial pistons is described in document FR 2872227.

One example embodiment of such a hydraulic machine including an internal multilobe cam associated with a cylinder block and external radial pistons is described in document FR 2940672.

It will be noted that on the side of the hydraulic machine 10, a long shaft 50 associated with a universal joint 55 connects one wheel to the gearbox 30 while passing through the hydraulic machine 10.

Moreover, the two left 53 and right 55 universal joints have substantially the same length and are advantageously identical or at least substantially identical.

It will also be noted that preferably, the machine 10 which forms the intermediate transmission bearing is positioned so that the couplings of the left 53 and right 55 universal joints are located at the same distance from the longitudinal axis of the vehicle, so that the two universal joints 53 and 55 are identical or at least substantially identical.

Figure 3:
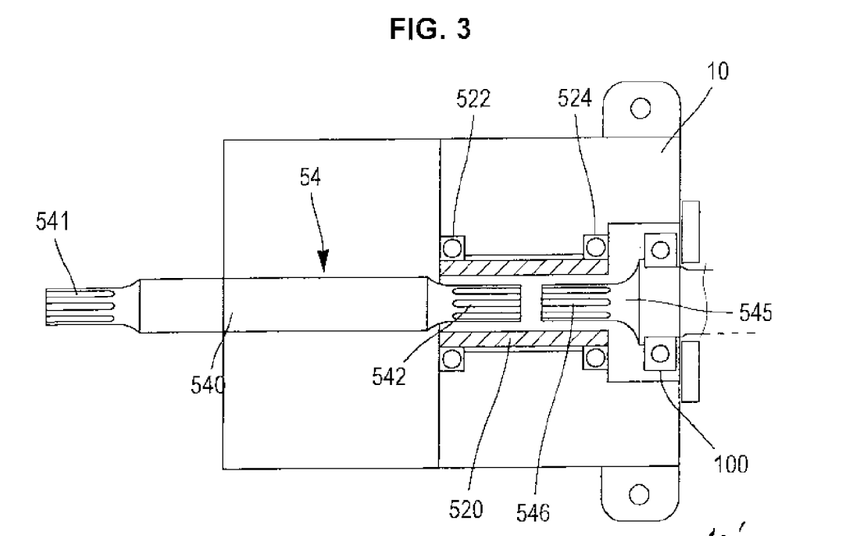
FIGS. 3 and 4 show schematically two variant embodiments conforming to the present invention and FIGS. 5, 6, 7 and 8 show four particular embodiments conforming to the present invention along cutting planes running through the axis of the bearing formed on the hydraulic machine, illustrating in particular the mounting of rollers serving as bearings and as gaskets.

Shown in the appended FIG. 3 is a variant embodiment conforming to the present invention.

In FIG. 3, the external shaft 12 provided for driving the hydraulic machine 10 is not shown to simplify the illustration.

The half-shaft 54 is formed here from two coaxial segments 540, 545, one of them, 540, coupled by any appropriate means, for example a fluted tip 541, with a satellite gear of the differential 40 and the other, 545, coupled to the universal joint 55. The two segments 540, 545 are coupled mechanically by an external splined sleeve 520, itself rotatably guided on the hydraulic machine 10 by two bearings 522, 524.

The splined sleeve 520 is engaged with two fluted tips 542 and 546 formed respectively on the respective adjacent ends of the two segments 540 and 545.

There too, as illustrated in FIG. 3, the segment 545 associated with the universal joint 55 is carried in rotation by a bearing 100 integrated on the casing of the hydraulic machine 10.

According to the embodiments illustrated in FIGS. 2 and 3, the differential 40 can be integrated into the gearbox 30.

Figure 4:
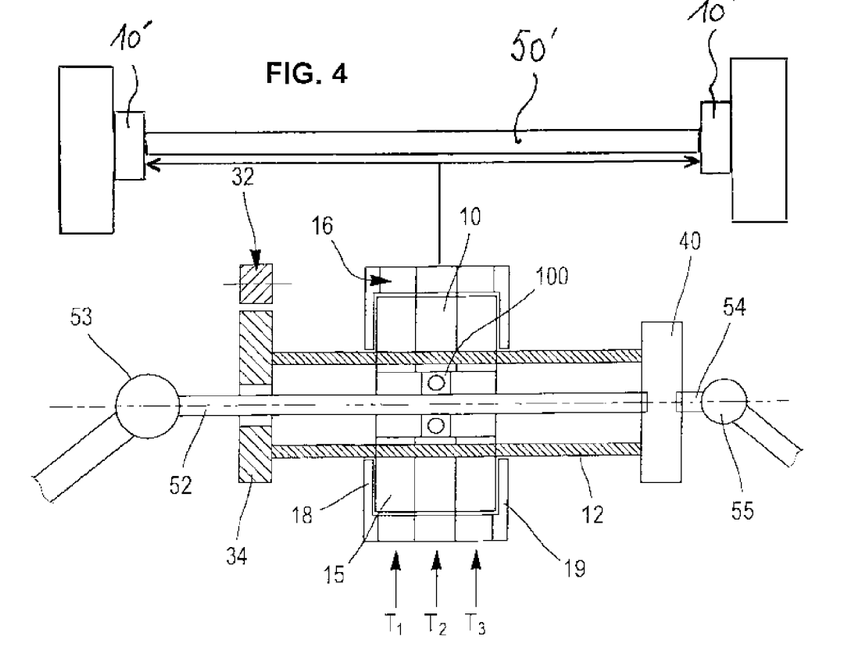
Figure 4A:
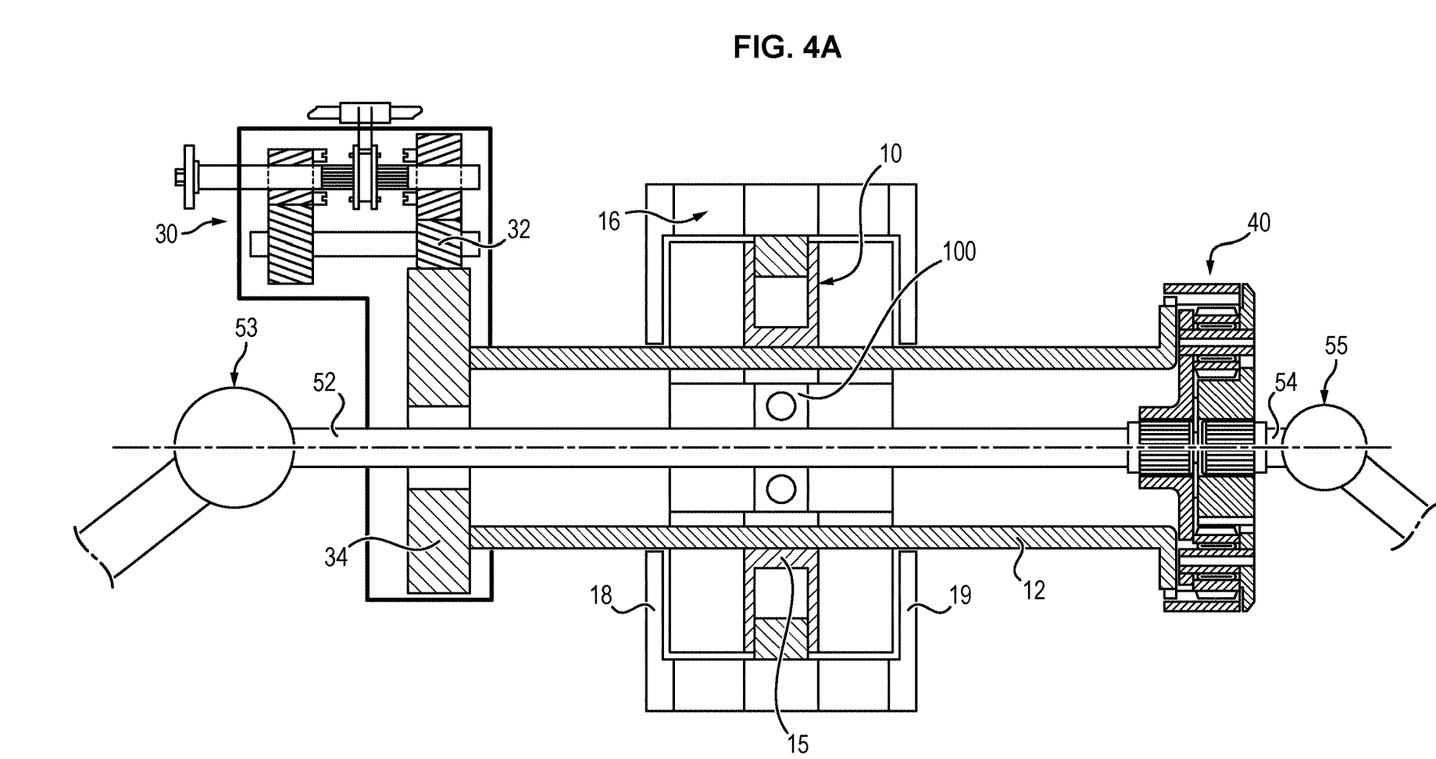

Shown in the appended FIG. 4 is a variant embodiment conforming to the invention according to which the differential 40 is offset to the right. According to this variant, the hydraulic machine 10 including the bearing 100 carries the half-shaft 52 associated with the left universal joint 53.

Observed in this FIG. 4 is a secondary shaft gear 32 of the gearbox 30 and the output gear 34 of the gearbox, connected to the large crown gear of the differential 40 through a tubular shaft 12. A second shaft 50' is coupled to pump 10. Hydraulic motors 10' are connected to second shaft 50'.

This tubular shaft 12 serves as a power take-off for transferring torque between the hydraulic machine 10 and the differential 40.

Represented schematically in FIG. 4 is a cylinder block 15 and a multilobe cam 16 forming a hydraulic machine 10 with radial pistons, of the aforementioned type.

Still more precisely, a hydraulic machine 10 is sketched on FIG. 4 formed by coaxial stacking of several wafers, in this case 3 wafers T1, T2 and T3, each including a cylinder block 15 and an associated multilobe cam 16, positioned between two end caps 18 and 19.

Preferably, different wafers are angularly offset so as to smooth the constant velocity operation of the machine.

The modular construction of the machine 10 by stacking several wafers makes it possible to increase the cylinder displacement of the machine.

The bearing 100 is shown schematically in the appended FIG. 4. In practice it is preferably carried by one of the caps 18, 19 or more generally an element of the casing of the machine 10.

Observed in each of the FIGS. 5, 6, 7 and 8 which illustrate four embodiments conforming to the present invention are:

an element 16 of the casing of the hydraulic machine, an intermediate shaft 12 formed by a hollow tubular shaft, which provides the rotational link between the hydraulic machine 10 and a gearbox 30 or a differential 40, the driving means between the hollow tubular shaft 12 and the rotating portion of the hydraulic machine 10 are not shown. They can be achieved by means of flutes or drive fingers, or by complex systems of the Oldham joint type a half-shaft 54 which passes through the tubular intermediate shaft 12 and which is driven by the differential 40 is connected to a universal joint 55 and a roller 100 which serves as a bearing for the half-shaft 54.

Figure 5:
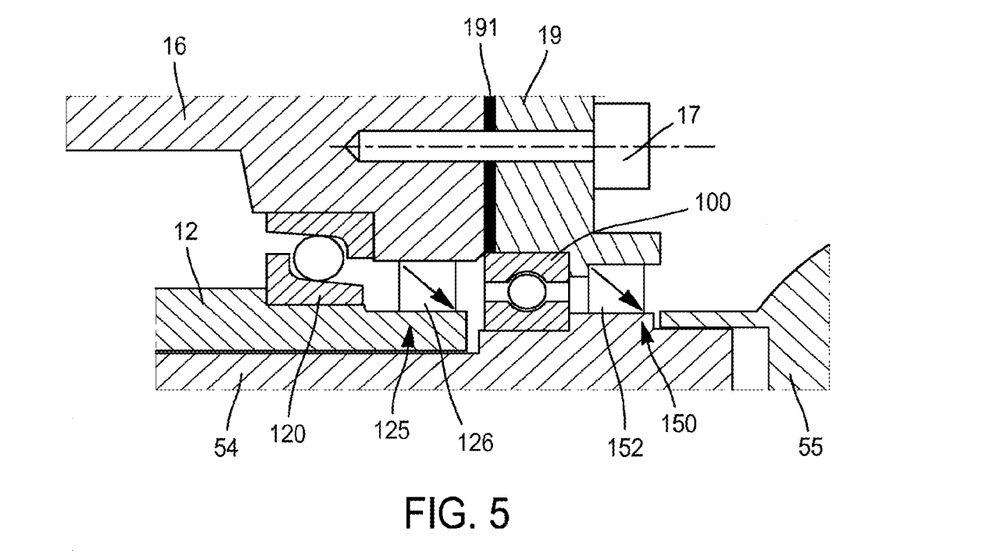
Figure 6:
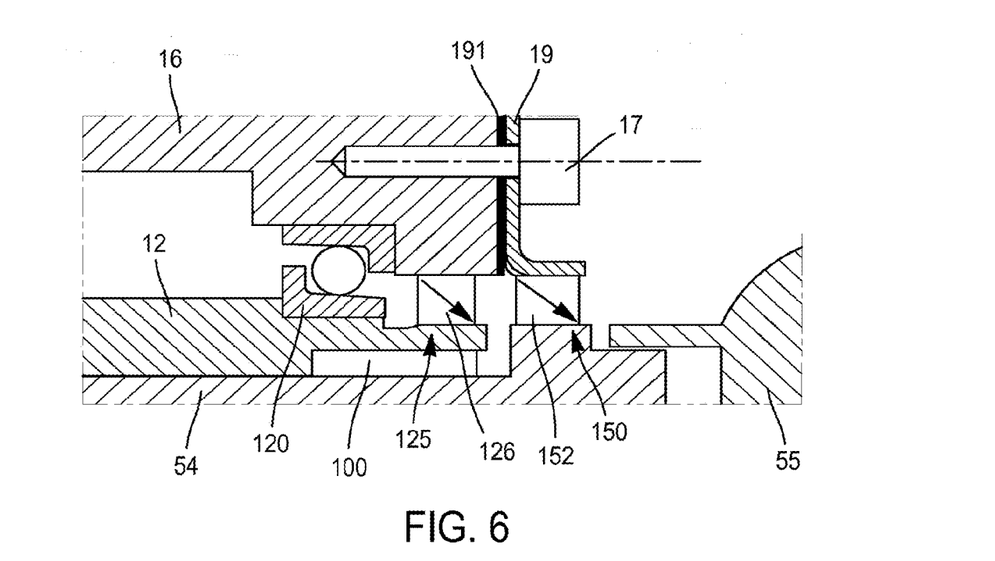
Figure 7:
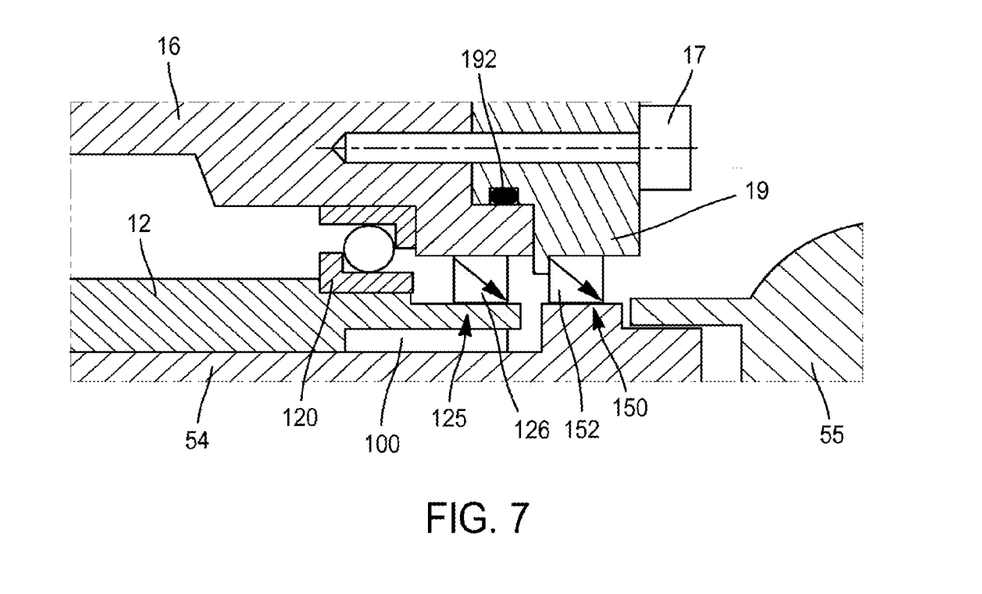

According to the embodiments illustrated in FIGS. 5, 6 and 7, the hydraulic machine 10 comprises a cap 19 fixed to the casing element 16 by threaded means 17 or any equivalent means. A gasket 191, a flat gasket by way of an example, or an O-ring in a groove, or a sealing paste, or any other ordinary sealing means between two joint planes, is interposed between the cap 19 and an end face of the element 16, transversely to the axis of rotation O-O according to FIGS. 5 and 6. According to the embodiment illustrated in FIG. 7, the sealing between the cap 19 and the element 16 is accomplished by an equivalent O-ring 192 mounted as a radial sealing.

Figure 8:
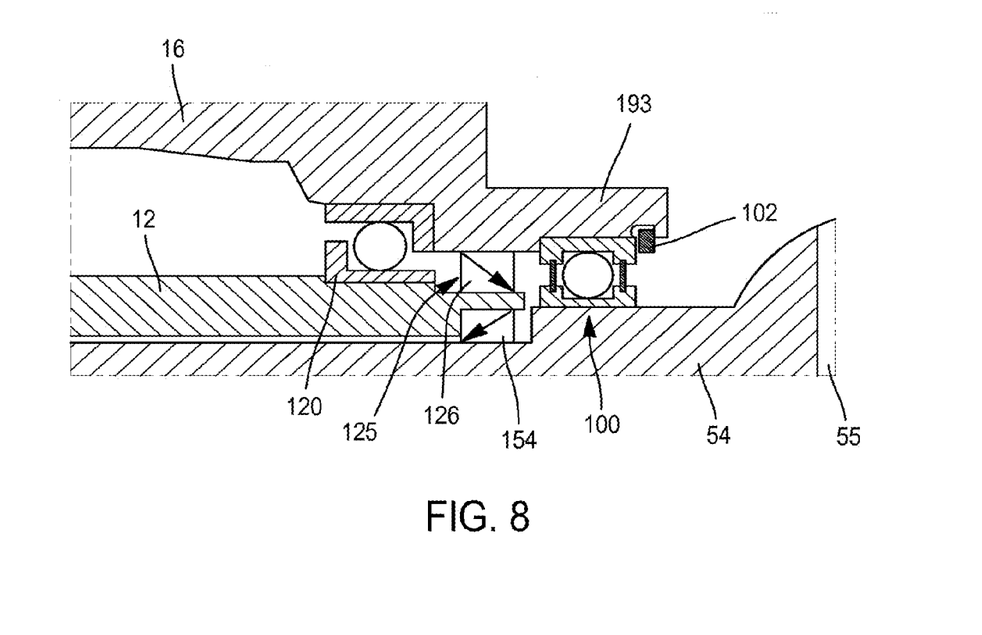

The embodiment shown in FIG. 8 does not comprise a cover 19 applied to the element 16. But according to FIG. 8, the casing element 16 includes an equivalent part 193 made in a single piece.

The intermediate tubular shaft 12 is supported in rotation by a roller 120, formed preferably from a ball bearing, interposed between the external surface of the shaft 12 and the element 16, according to the four embodiments of FIGS. 5 to 8.

According to the two embodiments illustrated in FIGS. 5 and 8, the roller 100 which forms a bearing for the half-shaft 54 is interposed between the external surface of the half-shaft 54 and a casing element of the hydraulic machine 10, more precisely the cap 19 according to FIG. 5 and the equivalent one-piece part 193 according to FIG. 8. In this case the roller 100 is preferably a ball bearing. Moreover, according to FIG. 8, the roller 100 is preferably a sealed bearing.

According to both embodiments illustrated in FIGS. 6 and 7, on the other hand, the roller which forms a bearing for the half-shaft 54 is interposed between the external surface of the half-shaft 54 and the internal surface of the tubular intermediate shaft 12, which itself is carried by the roller 120. In this case the roller 100 is preferably a needle bearing.

The four embodiments illustrated in FIGS. 5 to 8 further comprise associated sealing means respectively to the half-shaft 54 and to the intermediate shaft 12.

According to the embodiments illustrated in FIGS. 5, 6 and 7, the sealing means 150 associated with the half-shaft 54 are formed from a lip seal 152 interposed between the shaft 54 and the cap 19. According to the embodiment illustrated in FIG. 8, the sealing means 150 are formed from a lip seal 154 interposed between the shaft 54 and the tubular shaft 12.

According to the embodiments illustrated in the 4 FIGS. 5 to 8, the sealing means 125 associated with the intermediate shaft 12 are formed from a lip seal 126 interposed between the intermediate shaft 12 and the casing element 16 of the hydraulic machine 10.

It will be noted that, according to FIG. 8, the roller 100 that forms the bearing of the half-shaft 54 is retained axially on the hydraulic machine 10 by an annular retaining clip 102 engaged in a complementary groove of the part 193 of the casing of the hydraulic machine 10.

Different configurations can be accepted for providing the connection between the half-shaft 54 and the associated universal joint 55, as can be seen by comparatively examining FIGS. 4 to 8.

A person skilled in the art will understand, upon examining FIGS. 5 to 8, that according to the four embodiments illustrated, not only does the roller 100 carried directly or indirectly by the casing of the hydraulic machine 10 provide the rotation bearing of the half-shaft 54, but in addition sealing means 125 are provided between the intermediate shaft 12 and the casing of the hydraulic machine and sealing means 150 associated with the half-shaft 54, between the half-shaft 54 and the casing of the hydraulic machine 10.

Of course, the present invention is not limited to the embodiments which have just been described, but extends to all variants conforming to its spirit.

The present invention offers in particular a solution for placing a machine with a multilobed cam in proximity to a gearbox output and thus allows space saving with respect to available solutions conforming to the prior art.

The invention claimed is:

1. A drive assembly for a motor vehicle drive shaft comprising a motor (20),
   a gearbox (30) connected to the motor so that the gearbox is driven by the motor, a differential (40) connected to the gearbox so that the differential is driven by the gearbox,
   a shaft (50) split into two half-shafts coupled to the differential (40) so that each half-shaft is driven by the differential,
   a universal joint (53, 55) provided at the end of each half-shaft so that each universal joint drives a driving wheel,
   wherein said drive assembly further comprises a hydraulic machine (10) which forms a hydraulic pump,
   an external tubular shaft (12) connected between an output of the gearbox (30) and an input of the hydraulic pump so that the hydraulic pump is driven by said gearbox,
   wherein one of the half-shafts passes through said external tubular shaft and
   the hydraulic machine (10) further comprises a bearing (100) provided in the hydraulic pump for supporting said one of the half-shafts (54)
   said assembly further comprising a second shaft in addition to said shaft split into two half-shafts and
   hydraulic motors associated with the second shaft and
   wherein the hydraulic pump feeds said motors hydraulics associated with said second shaft.

2. The assembly according to claim 1, characterized in that the motor (20) is transversal with respect to the longitudinal direction of the vehicle.

3. The assembly according to claim 2, characterized in that the differential (40) is located on the side of the hydraulic machine (10).

4. The assembly according to claim 1, characterized in that the machine (10) is a pump with a multilobe cam (16) and with radial pistons.

5. The assembly according to claim 1, characterized in that on a side of the hydraulic machine (10), a long shaft (54) corresponding to one of said half-shafts which is associated with a universal joint (55) connects one wheel to the gearbox (30) while passing through the hydraulic machine (10).

6. The assembly according to claim 1, characterized in that two left and right universal joints (53, 55), have substantially the same length.

7. The assembly according to claim 1, characterized in that the machine (10) which serves as intermediate transmission bearing is positioned so that couplings of left (53) and right (55) universal joints are located at the same distance from the longitudinal axis of the vehicle, and that the two universal joints (53, 55) are identical.

8. The assembly according to claim 1, characterized in that the bearing (100) of said one of the half-shafts (54) is carried by an element of the casing of the hydraulic machine (10).

9. The assembly according to claim 8, characterized in that a roller forming the bearing (100) of said one of the half-shafts (54) is a ball bearing.

10. The assembly according to claim 1, characterized in that the bearing (100) of said one of the half-shafts (54) is carried by said external tubular shaft (12).

11. The assembly according to claim 10, characterized in that a roller forming a bearing (100) for said one of the half-shafts (54) carried by said external tubular shaft (12), itself supported by said casing element (16) of the hydraulic machine (10), is a needle bearing.

12. The assembly according to claim 1, characterized in that sealing means (150) associated with said one of the half-shafts (54) are interposed between said one of the half-shafts (54) and an element of casing of the hydraulic machine (10).

13. The assembly according to claim 1, characterized in that sealing means (125) formed by a lip seal, are interposed between said external tubular shaft (12) driven by the gearbox, and the casing of the hydraulic machine.

14. The assembly according to claim 1, characterized in that the bearing (100) of said one of the half-shafts (54), integrated with the hydraulic machine (10), is carried by a cap of the casing of the hydraulic machine (10).

15. The assembly according to claim 1, characterized in that sealing means (150) associated with said one of the half-shafts (54) are interposed between said one of the half-shafts (54) and said external tubular shaft (12) rotatably guided by an element of casing of the hydraulic machine (10).

16. The assembly according to claim 1, characterized in that the machine (10) is offset outside the gearbox (30).

17. A drive assembly for a motor vehicle drive shaft comprising
a motor (20),
a gearbox (30) connected to the motor so that the gearbox is driven by the motor,
a differential (40) connected to the gearbox so that the differential is driven by the gearbox,
a shaft (50) split into two half-shafts coupled to the differential (40) so that each half-shaft is driven by the differential,
a universal joint (53, 55) provided at the end of each half-shaft so that each universal joint drives a driving wheel,
wherein said drive assembly further comprises
a hydraulic machine (10) which forms a hydraulic pump,
an external tubular shaft (12) connected between an output of the gearbox (30) and an input of the hydraulic pump so that the hydraulic pump is driven by this said gearbox,
wherein one of the half-shafts passes through said external tubular shaft and
the hydraulic machine (10) further comprises a bearing (100) provided in the hydraulic pump for supporting said one of the half-shafts (54),
said assembly further comprising a second shaft in addition to said shaft split into two half-shafts and
hydraulic motors associated with the second shaft and
wherein the hydraulic pump (10) feeds said motors hydraulics associated with said second shaft.

18. A drive assembly for a motor vehicle drive shaft comprising
a motor (20),
a gearbox (30) connected to the motor so that the gearbox is driven by the motor,
a differential (40) connected to the gearbox so that the differential is driven by the gearbox,
a shaft (50) split into two half-shafts coupled to the differential (40) so that each half-shaft is driven by the differential,
a universal joint (53, 55) provided at the end of each half-shaft so that each universal joint drives a driving wheel,
wherein said drive assembly further comprises
a hydraulic machine (10) which forms a hydraulic pump
an external tubular shaft (12) connected between an input of the differential (40) and an input of the hydraulic pump so that the hydraulic pumps is driven by said external tubular shaft connected between said gearbox and said differential,
wherein one of the half-shafts passes through said external tubular shaft and
the hydraulic machine (10) further comprises a bearing (100) provided in the hydraulic pump for supporting said one of the half-shafts (54),
said assembly further comprising a second shaft in addition to said shaft split into two half-shafts and
hydraulic motors associated with the second shaft and
wherein the hydraulic pump (10) feeds said motors hydraulics associated with said second shaft.

19. A drive assembly for a motor vehicle drive shaft comprising a motor (20),
a gearbox (30) connected to the motor so that the gearbox is driven by the motor,
a differential (40) connected to the gearbox so that the differential is driven by the gearbox,
a shaft (50) split into two half-shafts coupled to the differential (40) so that each half-shaft is driven by the differential,
a universal joint (53, 55) provided at the end of each half-shaft so that each universal joint drives a driving wheel,
wherein said drive assembly further comprises
a hydraulic machine (10) which forms a hydraulic pump,
an external tubular shaft (12) connected between an output of the gearbox (30) and an input of the hydraulic pump so that the hydraulic pump is driven by said gearbox,
wherein one of the half-shafts passes through said external tubular shaft and
the hydraulic machine (10) further comprises a bearing (100) provided in the hydraulic pump for supporting said one of the half-shafts (54) and
wherein the bearing (100) of said one of the half-shafts (54) is carried by said external tubular shaft (12).

20. A drive assembly for a motor vehicle drive shaft comprising a motor (20),
a gearbox (30) connected to the motor so that the gearbox is driven by the motor,
a differential (40) connected to the gearbox so that the differential is driven by the gearbox,
a shaft (50) split into two half-shafts coupled to the differential (40) so that each half-shaft is driven by the differential,
a universal joint (53, 55) provided at the end of each half-shaft so that each universal joint drives a driving wheel,
wherein said drive assembly further comprises
a hydraulic machine (10) which forms a hydraulic pump,
an external tubular shaft (12) connected between an output of the gearbox (30) and an input of the hydraulic pump so that the hydraulic pump is driven by said gearbox,
wherein one of the half-shafts passes through said external tubular shaft and
the hydraulic machine (10) further comprises a bearing (100) provided in the hydraulic pump for supporting said one of the half-shafts (54) and
wherein a roller forming a bearing (100) for said one of the half-shafts (54) carried by said external tubular shaft (12), itself supported by said casing element (16) of the hydraulic machine (10), is a needle bearing.

* * * * *